United States Patent Office 2,931,432
Patented Apr. 5, 1960

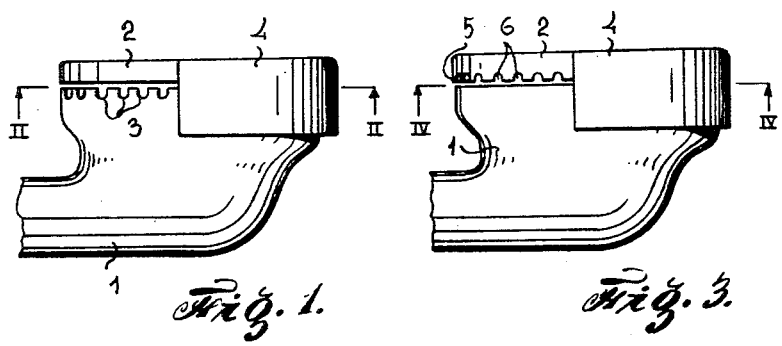
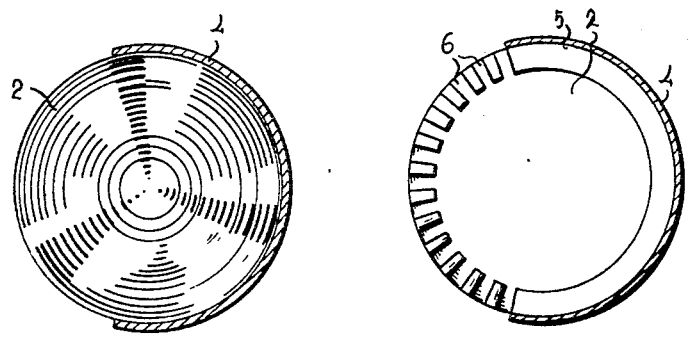

2,931,432

LID FOR A BURNER OF A GAS-RING OR A GAS-COOKER

Emilie Marie Julie Gonsalves, Arnhem, Netherlands

Application September 27, 1955, Serial No. 536,928

Claims priority, application Netherlands October 20, 1954

2 Claims. (Cl. 158—116)

This invention relates to burner arrangements.

It is known that the spilling of milk and similar liquids can be prevented if a saucepan is placed over a burner the flame of which burns exclusively on one side of a plane of symmetry through the burner.

An object of the invention is to make it possible for existing burners to be changed in a very convenient and inexpensive manner into burners operating according to the above mentioned principle.

Practically all conventional burners are one of two types. There is the type in which the gas vents are formed between the grooved upper rim of a burner and the smooth lower surface of the associated lid; and there is the type in which the gas vents are formed between the smooth upper rim of the burner and grooves provided in a thickened circumferential rim on the lower side of the lid.

According to the invention, a lid for the first type of burner has an overhanging collar through part of its circumference, and at least through half its circumference, in such a manner that the gas vents formed in that part of the circumference are shut off by the collar.

In a lid for the second type of burner according to the invention, the grooves in the thickened circumferential rim are omitted through part of the circumference, and at least through half the circumference of the lid. Thus, no gas vents at all are formed in that part of the circumference. In order to shut off any leakage holes that may appear between the rim of the burner and the lid, however, it is preferable for the lid to have moreover an overhanging collar through the part of the circumference from which the grooves have been omitted.

In order to obtain on the one hand sufficient asymmetry of the burner flames to prevent spilling and on the other hand to avoid concentrating the heat too much in one place, which might result in burning of the milk, it has been found favorable for the part of the circumference through which the lid has an overhanging collar, or the grooves in the thickened circumferential rim have been omitted, to constitute about $7/12$ of the total circumference of the lid. This presents the additional advantage that the collar also keeps the lid in place, since the collar thus encloses the burner through more than half its circumference.

The drawing illustrates by way of example two embodiments of a lid according to the invention:

Figure 1 is a side elevational view of a lid placed on a burner in which the gas vents are formed between the grooved upper rim of the burner and the smooth lower surface of the lid.

Figure 2 is a cross-section along the line II—II in Figure 1.

Figure 3 is a side elevational view of a lid placed on a burner in which the gas vents are formed between the smooth upper rim of the burner and the grooves are provided in a thickened circumferential rim on the lower side of the lid.

Figure 4 is a cross-section along the line IV—IV in Figure 3.

In the drawing, the numeral 1 designates a burner and 2 the lid to be placed thereon. The burner according to Figure 1 is of the type which is provided along its upper rim with grooves 3, which, together with the smooth lower surface of the lid, form the gas vents. In such cases, the lower surface of the lid usually is slightly convex. The lid 1 is provided with an overhanging collar 4 over about $7/12$ of its circumference. By means of this collar, a portion of the gas vents is covered so that free gas vents are left through only $5/12$ of the circumference of the burner. The collar 4 serves at the same time to fix the lid 2 in the right position relative to the burner 1, since it encloses the burner through more than half its circumference.

The burner 1 according to Figure 3 is of the type having a smooth upper rim. In this case, the lid 2 is provided in the usual manner with a thickened circumferential rim 5 on its lower side, in which are made grooves 6, which, together with the smooth rim of the burner 1, form the gas vents. In contrast with the known lids, however, the grooves 6 in the circumferential rim 5 have here been omitted through about $7/12$ of the circumference, so that no gas vents at all are formed in that part of the circumference.

Although therefore in this case no gas vents need be shut off by a collar, the provision of such a collar 4 has its use for preventing leakage that may occur between the rim of the burner and the lid, and also for fixing the lid in the right position.

It will be obvious that it is possible to use on a burner alternately a lid according to the invention and a conventional lid, since the exchange of the conventional lid for one according to the invention and conversely is no trouble at all.

What is claimed is:

1. A gas burner lid comprising a circular metal disc having a thickened peripheral rim on its lower side, said rim being provided with radial grooves on about $5/12$ of its circumference and having at its periphery an integrally formed depending non-resilient metal collar extending over about the remaining $7/12$ of its circumference.

2. A burner arrangement comprising a freely detachable lid having a lower surface, a burner including a grooved upper rim defining gas vents with the lower surface of the lid, the lid being circular, and an overhanging collar on about $7/12$ of the periphery of said lid to shut off said gas vents.

References Cited in the file of this patent

UNITED STATES PATENTS

| 410,092 | Gummer | Aug. 27, 1889 |
| 458,433 | Stott | Aug. 25, 1891 |
| 873,182 | Springer et al. | Dec. 10, 1907 |
| 1,314,860 | Ewan | Sept. 2, 1919 |
| 1,964,214 | Rockhill | June 26, 1934 |

FOREIGN PATENTS

| 41,990 | Netherlands | Nov. 15, 1937 |